Dec. 10, 1957 L. S. LAPPIN 2,816,268

METERING CIRCUIT

Filed Jan. 5, 1955

INVENTOR.
Lester S. Lappin
BY
Charles H. Brown
Attorney

United States Patent Office 2,816,268

Patented Dec. 10, 1957

2,816,268

METERING CIRCUIT

Lester S. Lappin, Merchantville, N. J., assignor to Radio Corporation of America, a corporation of Delaware Application January 5, 1955, Serial No. 479,900

4 Claims. (Cl. 332—39)

Figure 1:
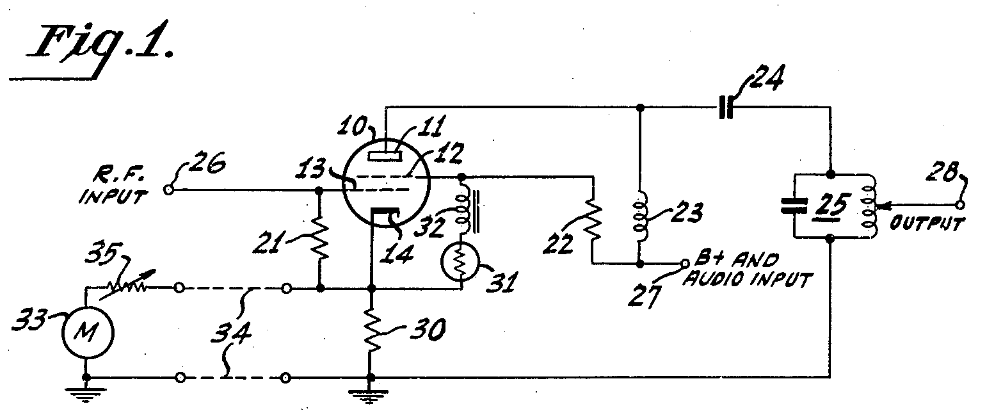

The invention relates to a current measuring or metering circuit, and particularly to means for measuring the anode current of a multigrid electron discharge device over a land line circuit, one side of which is grounded.

In radio transmitters or other electronic equipment, it is desirable to measure the anode current of certain electron discharge devices. Normally, this is easily accomplished by connecting a current measuring device in series with the anode. Or, if the electron discharge device is a triode, the current measuring device can be connected in series with the cathode, and the grid circuit return can be connected to the cathode. In both cases, the current indicating device indicates only anode current.

When a radio broadcasting transmitter is operated by remote control, the Federal Communications Commission requires that the anode current of the power amplifier tube or tubes be monitored at the control point of the transmitter. In order to transmit a voltage that is proportional to the anode current over a telephone line between the transmitter and the control point, it is necessary that one side of the telephone line be essentially at ground potential. To keep one side of the line at ground potential, the metering circuit must be inserted in the cathode circuit of the power amplifier tube. However, if the tube has a screen grid, it is not possible to obtain an accurate indication of the anode current with a meter connected in the cathode circuit, since the meter will also indicate the screen grid current. And when the transmitter is modulated, the resulting variations in screen grid current cause the meter to give erroneous indications of the anode current.

Accordingly, an object of the invention is to enable a relatively accurate measurement of the anode current of a screen grid electron discharge tube to be made over a land line circuit (for example a telephone line), one side of which is at ground potential.

Another object of the invention is to measure at a remote point the anode current of a screen grid electron discharge tube with a meter or indicating circuit in the cathode circuit of the tube.

These and other objects of the invention are accomplished by connecting one end of a varistor to the cathode, and an inductance element between the other end of the varistor and the screen grid of the electron discharge tube. The characteristics of the varistor are such that the current through it is a non-linear function of the applied voltage. A relatively small change in voltage causes a disproportionately large change in current. Any increase in screen grid current lowers the screen grid voltage, thus causing a decrease in the current flowing through the varistor. Any decrease in screen grid current raises the screen grid voltage, thus causing an increase in the current flowing through the varistor. In both cases, the sum of screen grid current and varistor current remains substantially constant. Thus, variations in the current flowing in the cathode circuit are mainly a result of variations in the current flowing in the anode circuit. By connecting a current indicating device in the cathode circuit, a reasonably accurate indication of the anode current is obtained. The inductance element prevents distortion of the intelligence being used to modulate the electron discharge tube.

The invention is explained in detail in the following description with reference to the accompanying drawing, in which:

Fig. 1 shows a circuit arrangement in accordance with the invention; and

Figure 2A:
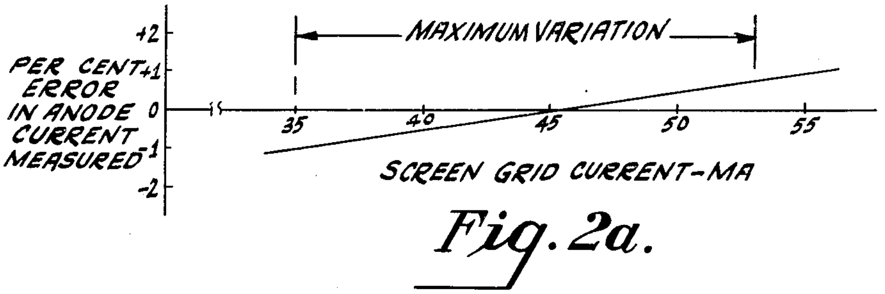
Figure 2B:
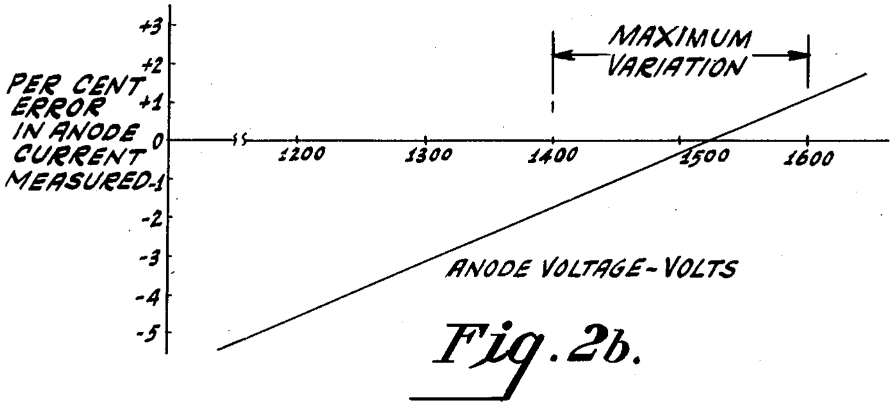

Figs. 2*a* and 2*b* show graphs illustrating the accuracy of measurement obtained with the invention under different operating conditions.

The modulated power amplifier stage of a radio transmitter utilizing the invention is shown in Fig. 1. Such a stage comprises one or more evacuated electron discharge devices or power amplifier tubes 10. If a pair of such tubes are used, the tubes may be connected in a parallel or a push-pull relationship. Such a tube 10 usually comprises an anode 11, a screen grid 12, a control grid 13, and a cathode 14. The cathode 14 is usually directly heated and connected in ways known to those skilled in the art. The control grid 13 is connected to the cathode 14 by an impedance element, such as a resistor 21. A source of D.-C. potential that is positive with respect to a point of reference potential is applied to a terminal 27. This terminal 27 is connected to the screen grid 12 by an impedance element, such as a resistor 22, and to the anode 11 by an impedance element, such as a large choke coil 23.

Radio frequency energy may be applied to the control grid 13 at the input terminal 26, and audio frequency energy or intelligence may be applied at the terminal 27 to modulate the radio frequency energy. The modulated signal may be derived from an output terminal 28 which is tapped on the inductance of a parallel resonant circuit 25. This resonant circuit is connected between a point of reference potential, such as ground, and one end of a coupling capacitor 24, the other end of which is connected to the anode 11 of the tube 10.

The metering or indicator circuit comprises a metering resistor 30 connected between the cathode 14 and the point of reference potential. This metering resistor 30 preferably has a resistance low enough to maintain a low voltage drop when the maximum current flows through it. The cathode 14 is also connected to the screen grid 12 by a varistor 31 and an inductance element 32 connected in series. A meter 33 having the appropriate current measuring range is connected across the metering resistor 30 by a line, such as a telephone line 34, if the transmitter is remotely located with respect to the control point. A variable resistance 35 is inserted in series with the meter 33 to adjust the current flow through the meter 33.

When the stage shown in Fig. 1 is in operation, the cathode current flowing through the metering resistor 30 comprises the anode current, the screen grid current, and the varistor current. A varistor, such as the varistor 31 shown in Fig. 1, acts as a resistor whose resistance depends upon, and is an inverse function of, the magnitude of the voltage applied to the varistor. Since the voltage applied to the varistor 31 depends upon the voltage appearing at the screen grid 12, any change in screen grid voltage will change the resistance of, and hence the current flowing through, the varistor 31. If the screen grid current increases, the voltage drop across the screen grid resistor 22 also increases, and the screen grid voltage decreases. This decrease in the screen grid voltage causes a decrease in the current flowing through the varistor 31 of such value that the increase in screen grid current is substantially equal to the decrease in varistor current. If, on the other hand, the screen grid current decreases, the voltage drop across the screen grid resistor 22 also decreases, and the screen grid voltage increases. This increase in the screen grid voltage causes an increase in the current flowing through the varistor 31 of such value that the decrease in screen grid current is substantially equal to the increase in varistor current. Thus the current flowing through the screen grid resistor 22 remains substantially constant for varying values of the screen grid voltage.

Since the current flowing through the screen grid resistor 22 (which is the sum of the current flowing through the screen grid 12 and through the varistor 31) remains substantially constant, the only variation in the current flowing through the metering resistor 30 is a result of variations in the anode current. If the current flowing through the screen grid resistor 22 is known, the anode current may be calculated by subtracting this current from the total current through the metering resistor 30. Or, a meter, such as the meter 33 shown in Fig. 1, may be calibrated to indicate this current by a direct reading.

The meter 33 may be connected across the metering resistor 30 at the transmitter, or at a remote point by a telephone line 34. One side of the line 34 is grounded, and since the metering resistor 30 preferably has a resistance low enough to maintain a low voltage drop, the other side of the line is kept at a low potential.

When audio frequency or other energy is applied to the terminal 27 to modulate the transmitter, a varying voltage appears on the screen grid 12. The varistor 31 would normally tend to remove this modulation voltage and thus introduce distortion. To prevent this distortion, it is desirable to connect a suitable reactance element, such as the inductance element 32 shown, in series with the varistor 31. With this reactance element, the screen grid voltage may vary rapidly with the applied modulation without any change in the current flow through the varistor 31. However, slow variations in the screen grid voltage which affect the accuracy of the current measurement cause the desired change in the current flowing through the varistor.

An embodiment of the metering circuit described was satisfactorily employed in a 250 watt AM broadcast transmitter. Values used in the circuit, given by way of example only, are as follows:

| | |
|---|---|
| Tube **10** | Two 813 tubes connected in parallel. |
| Screen resistor **22** | 20,000 ohms. |
| Metering resistor **30** | 3.3 ohms. |
| Varistor **31** | Three G. E. No. 6851386Gl thyrite resistors connected in series. |
| Reactance element **32** | 300 henries. |
| Meter **33** | 0–200$\mu$a. |
| Variable resistor **35** | 0–5000 ohms. |

With such values in the metering circuit and with an anode potential of 1600 volts, an anode current of 250 ma. and a screen resistor current of 50 ma. were obtained. These values gave a total cathode current of 300 ma., which gave a voltage drop of approximately one volt across the 3.3 ohms metering resistor 30. The variable resistor 35 was adjusted so that the total impedance of the meter 33 and the telephone line 34 was 5000 ohms. These values gave a full-scale deflection of the meter 33 when one volt was developed across the metering resistor 30. While other values may be used, a voltage drop of one volt across the metering resistor 30 did not interfere with the operation of the transmitter, yet it was sufficient to give an indication on the meter 33. A total impedance of 5000 ohms permits using approximately 29 miles of No. 22 gauge telephone cable in the telephone line 34.

Figs. 2*a* and 2*b* show the accuracy of measuring the anode current obtained in accordance with the invention when using a transmitter having the values specified above. For the maximum variation of screen grid current, Fig. 2*a* shows that the error in measuring the anode current did not exceed plus or minus one percent. For the maximum variation of anode voltage, Fig. 2*b* shows that the error in measuring the anode current did not exceed plus one percent or minus two percent. These ranges are within the limits specified by the Federal Communications Commission for remote monitoring of broadcast transmitters.

The invention claimed is:

1. A metering circuit for remotely measuring anode current in an electron discharge device having at least an anode, a cathode, a control grid, and a screen grid, comprisng impedance elements connected to said anode and said screen grid for applying operating potentials thereto, means connected to said cathode and a point of reference potential for connecting a current indicating device between said cathode and a point of reference potential, a varistor having one end connected to said cathode, and a reactance element connected between the other end of said varistor and said screen grid, said varistor maintaining a substantially constant current flow between said cathode and said screen grid for varying magnitudes of screen grid voltage.

2. A metering circuit in accordance with claim 1 including a relatively low value resistor connected in circuit with said cathode and in shunt with said current indicating device, means for applying radio frequency waves to said control grid, and means for applying modulation signals to said screen grid.

3. A metering circuit for remotely measuring anode current in an electron discharge device having at least an anode, a cathode, a control grid, and a screen grid, comprising impedance elements connected to said anode and said screen grid for applying operating potentials thereto, a cathode resistor connected between said cathode and a point of reference potential for developing a potential proportional to the current flow in said cathode, a varistor connected between said cathode and said screen grid to maintain a substantially constant current flow between said cathode and said screen grid for varying magnitudes of screen grid voltage, and means connected to said cathode resistor for connecting a current indicating device across said cathode resistor.

4. A metering circuit for remotely measuring anode current in a power amplifier tube having at least an anode, a cathode, a control grid, and a screen grid, comprising impedance elements connected to said anode and said screen grid for applying operating potentials thereto, a cathode impedance element connected between said cathode and a point of reference potential for developing a potential proportional to the current flow in said cathode, a varistor having one end connected to said cathode, an inductance element connected between the other end of said varistor and said screen grid, said varistor maintaining a substantially constant current flow through said impedance element connected to said screen grid for varying magnitudes of screen grid voltage, a land line connected across said cathode impedance element, and means for connecting a current indicating device across said land line at a point remote from said amplifier tube.

References Cited in the file of this patent

UNITED STATES PATENTS

| | | |
|---|---|---|
| 2,032,199 | Braden | Feb. 25, 1936 |
| 2,177,847 | Tamm | Oct. 31, 1939 |
| 2,385,566 | De Guire | Sept. 25, 1945 |
| 2,458.830 | Byrne | Jan. 11, 1949 |